United States Patent
Wiseburgh et al.

(10) Patent No.: US 6,319,414 B1
(45) Date of Patent: Nov. 20, 2001

(54) WATER PURIFYING AND DISPENSING APPARATUS

(75) Inventors: Peter Wiseburgh, Jerusalem; Gerald Tanny, Rehovot, both of (IL); Peter Hulley, Peterborough (GB)

(73) Assignee: Soda Club (CO2) Atlantic GmbH, Zug (CH)

( * ) Notice: Subject to any disclaimer, the term of this patent is extended or adjusted under 35 U.S.C. 154(b) by 0 days.

(21) Appl. No.: 09/540,588

(22) Filed: Mar. 31, 2000

Related U.S. Application Data

(63) Continuation of application No. PCT/IL98/00470, filed on Sep. 28, 1998.

(30) Foreign Application Priority Data

Oct. 5, 1997 (IL) ....................................................... 121885

(51) Int. Cl.$^7$ .................................................... B01D 17/12
(52) U.S. Cl. .......................... 210/739; 210/87; 210/100; 210/137; 210/138; 210/258; 210/767; 222/251
(58) Field of Search ................................ 210/87, 88, 91, 210/94, 97, 100, 109, 110, 134, 137, 138, 143, 257.1, 257.2, 258, 259, 335, 416.3, 739, 767, 808, 266, 282; 222/1, 25, 36, 52, 55, 61, 189.06, 189.11, 394, 399, 251; 141/1, 2, 18, 69, 70, 94

(56) References Cited

U.S. PATENT DOCUMENTS

| | | |
|---|---|---|
| 3,455,146 | 7/1969 | Smith et al. . |
| 3,556,350 | 1/1971 | Hanley . |
| 4,623,467 | 11/1986 | Hamlin .................................. 210/652 |
| 4,681,677 * | 7/1987 | Kuh et al. ............................... 210/88 |
| 4,784,763 | 11/1988 | Hambleton et al. .................... 210/90 |
| 4,801,375 | 1/1989 | Padilla ................................... 210/100 |
| 4,842,724 * | 6/1989 | Bray et al. .......................... 210/416.3 |
| 4,918,426 * | 4/1990 | Butts et el. . |
| 4,983,288 | 1/1991 | Karbachsch et al. ............ 210/321.87 |
| 5,045,197 | 9/1991 | Burrows ........................... 210/321.78 |
| 5,096,596 | 3/1992 | Hellenbrand et al. ................ 210/218 |
| 5,209,378 * | 5/1993 | Wiseburgh et al. . |
| 5,536,395 * | 7/1996 | Kuennen et al. ........................ 210/87 |
| 5,540,107 * | 7/1996 | Silverman et al. ..................... 210/87 |
| 5,569,375 | 10/1996 | Ridgeway ............................. 210/137 |
| 5,628,895 * | 5/1997 | Zucholl .................................. 210/85 |
| 5,674,381 * | 10/1997 | Den Dekker ........................... 210/85 |
| 5,876,610 * | 3/1999 | Clack et al. ............................ 210/87 |

FOREIGN PATENT DOCUMENTS

| | | |
|---|---|---|
| 0 312 079 | 4/1989 | (EP) . |
| 0 438 372 | 1/1991 | (EP) . |
| 472995 * | 8/1991 | (EP) . |
| 0 539 069 | 10/1992 | (EP) . |
| 2 573 062 | 11/1984 | (FR) . |
| 188999 | 9/1985 | (HU) . |
| 213084 | 5/1997 | (HU) . |
| 215357 | 4/1999 | (HU) . |

OTHER PUBLICATIONS

Perry, et al., "Perry's Chemical Engineer's Handbook", 6th Edition, McGraw Hill, pp. 19–65 to 19–67, Undated.
Waring, R.H. "Filters and Filtration Handbook", Huston Gulf Publishing Company, pp. 55–56, Undated.
Hungarian Search Report, Dated Feb. 23, 2001.

* cited by examiner

Primary Examiner—Joseph W. Drodge
(74) Attorney, Agent, or Firm—Merchant & Gould P.C.

(57) ABSTRACT

An apparatus and corresponding method for purifying water is described. The apparatus includes a supporting housing, a source of power, a filter device containing at least one interchangeable filter unit having one or more filter elements, a mechanism for driving water through the filter device and a timing mechanism for monitoring elapsed time of operation and a mechanism for monitoring cumulative volume of water having flowed through the filter device which are each coupled to a filter memory. The mechanism for driving water through the filter device includes a cylinder holder on which an interchangeable gas pressure cylinder can be mounted, a gas release mechanism housed in the cylinder holder, a flow regulator and conduits connecting the other components together.

49 Claims, 9 Drawing Sheets

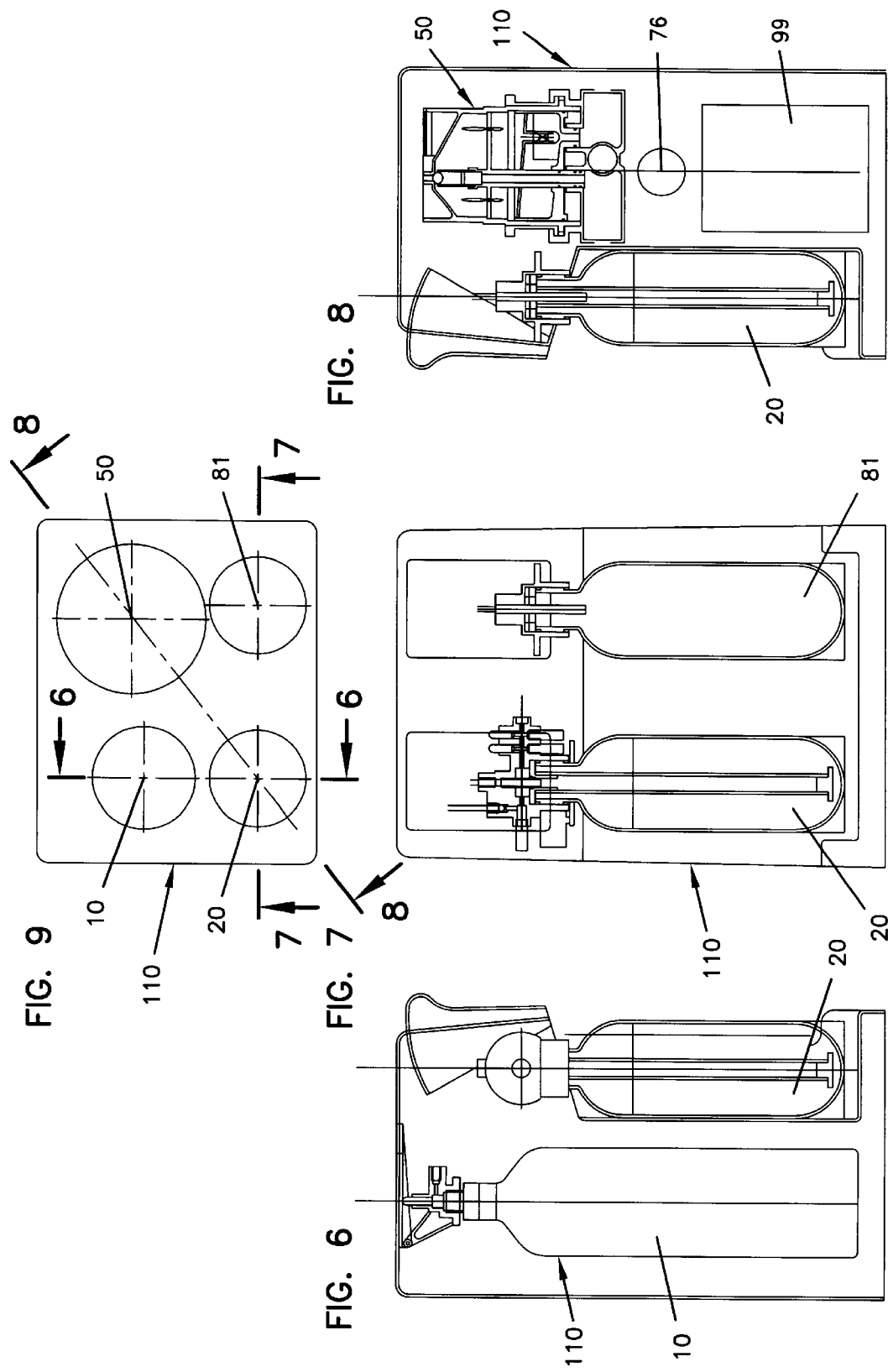

WATER PURIFYING AND DISPENSING APPARATUS

This application is a continuation of international application number PCT/IL98/00470, filed Sep. 28, 1998.

FIELD OF THE INVENTION

This invention relates to apparatus and methods for purifying water that is or may be infected by microorganisms and rendering it potable, particularly for use in localities where the water supply is unsafe or unreliable, and dispensing purified water. In particular, it relates to means for rendering drinking water sterile, and thus safe for infants and other persons that must be protected against even mild infection. In a form of the invention, the apparatus is self-contained, adapted for home use, and can be easily carried and displaced by the user.

BACKGROUND OF THE INVENTION

In many localities, no safe and reliable water supply is available. A water distribution system may be lacking or, frequently, such a system may exist but deliver water that is not or may not be safe and fit for drinking because it is contaminated, particularly by microorganisms. The problem of providing safe, potable water in such localities, without the addition of chemicals, which impart a bad taste to the water and are not without danger, has received wide attention and has found a variety of solutions in the art. It is known to to a water conduit or to a water faucet a purifying apparatus provided with filtering means. For instance, U.S. Pat. No. 5,338,456 discloses a water purification process for removing dissolved solids of a type that are normally present in a municipal water supply or the like, which process uses a forced draft decarbonator, a water degasifier, a product outlet, a water level sensor, and a reverse osmosis unit.

These apparatus, however, are cumbersome and expensive and are not suitable for independent, family use. Further, they cannot be used when an adequate, centralized water supply system does not exist. Finally, they do not provide a supply of fresh, potable water at any distance from the water faucets, either within the house and in camping. None of them, further, provides sterile water.

Another problem which exists in such apparatus is the inner contamination danger created by the fact that, with the passage of time, the apparatus filters become heavily contaminated with microorganisms which multiply, and thus constitute a health hazard instead of a defense against such a hazard. Contamination may derive from a very small number of microorganisms, even from a single one, since their capacity for multiplication is extremely high.

JP 05185070 (Kokai No. 5-185070) notes that in domestic water purifiers the filter module must be replaced when the water that has flown through it has exceeded the allowable absorption capacity of the absorbent inside the module, and that water purifiers are known which are provided with a life meter capable of displaying the time of replacing the filter module. However, the known devices are said to be unreliable because they measure only the time of the water flow and this does not provide a reliable indication due to fluctuations in the water flow rate. Therefore said application proposes a domestic water purifier which comprises a constant flow rate valve, a sensor for detecting start and stop of water flow and generating corresponding signals, and means for measuring an integrated operating time based on said signals and displaying a signal when said integrated time reaches a preset value. The constant flow rate valve has the only purpose of permitting to measure said integrated time accurately, and until said preset value has been reached, the filter is not changed regardless of the volume of water that has flown through it, to which no independent significance is attributed. The application shows various structures of constant flow rate valves, but as to the filter module it shows no structure and states that the invention may utilize various structures of the prior art, nor does it describe a complete apparatus free of the drawbacks of the prior art.

It is the purpose of this invention to provide an apparatus for rendering water potable and dispensing potable water, that is free of the limitations and drawbacks of prior art apparatus.

It is another purpose of this invention to provide such an apparatus that is adapted to provide sterile water.

It is a further purpose of this invention to provide such an apparatus that is self-contained, compact, and economical.

It is a still further purpose of this invention to provide such an apparatus that may be portable or not portable, as desired, and, if portable, is easy to carry and displace from one point to another, so that it can be used, for instance, in the home in any room and or outside the home, such as in camping.

It is a still further purpose of this invention to provide such an apparatus which is free from the danger of inner contamination, in particular, the danger of the accumulation and multiplication of microorganisms in the apparatus filter.

It is a still further purpose of this invention to provide such an apparatus that is simple, easy to use, and safe.

It is a still further purpose of this invention to provide such an apparatus in which the ratio of the weight and volume of the apparatus to those of the amount of water that can be dispensed by it are reduced to a minimum.

It is a still further purpose of this invention to provide such an apparatus having a filter that is compact and inexpensive and delivers a large volume of purified water per unit filter volume.

Other purposes and advantages of this invention will appear as the description proceeds.

SUMMARY OF THE INVENTION

The apparatus according to the invention is characterized in that it comprises, preferably in addition to a supporting housing and with power means, structural components and interchangeable components, the structural components comprising;

1—a cylinder holder, on which a gas pressure cylinder can be mounted;

2—a gas dosing mechanism, housed in the cylinder holder;

3—an inlet bottle holder, for receiving an unfiltered water bottle;

4—a filter base;

5—a flow regulator, part of a filter unit or connected to an outlet of the filter unit;

6—a dispense water holder, for receiving a filtered water bottle;

7—conduit means for successively connecting together the cylinder holder, the inlet bottle holder, the filter base, the flow regulator and the dispense water holder; and 8—constant flow and usage controlling devices.

and the interchangeable components comprising:

8—a gas cylinder;
9—an inlet vessel, e.g., a water bottle for receiving the unfiltered water;
10—a filter unit housed in the filter base; and
11—a vessel for collecting the filtered water.

The controlling devices are preferably electronic and more preferably comprise a CPU, means for counting the time passed from a predetermined initial moment, more preferably from the installation of the filter, means for measuring with a desired accuracy the volume of water that has passed through the filter, means for producing and displaying visible signals indicating the conditions of the filter as indicated by the relationship between the counts of said counting means and the reading of said measuring means and a predetermined operating program, and means for preventing the flow of water through the filter when said counts have reached a predetermined threshold value. Said volume measuring means are preferably distinct from and independent of said flow regulator, the purpose of which is not to assist in measuring water volume (though this is not excluded) but to optimize the performance of the filter. More preferably, said volume measuring means comprise means for counting the number of times that an inlet water bottle has been mounted on the apparatus and is operated in or pressurized in the apparatus.

The interchangeable gas cylinders contain a gas, typically carbon dioxide, under pressure. The carbon dioxide pressure, in a full cylinder, is generally about 50 atmospheres. Gas under pressure is introduced into the inlet bottle, in such amounts as to generate therein a pressure, considerably lower than that in the gas cylinder, to cause the water to flow through the apparatus, and therefore such bottles, which are generally of plastic, must be of sufficient strength to contain a pressure generally of about 10 atmospheres.

The cylinder holder may be any cylinder holder adapted to receive a gas pressure cylinder in a liquid aerating machine, preferably such as described in EP 0 472 995 B1, the content of which is entirely incorporated herein by reference. The liquid aerating machine described in said EP has a gas release mechanism directly controlled by the operator, and this can be used in an apparatus according to the invention. Alternatively, a dosing unit may be provided, that is designed to release a predetermined dose of gas from the gas cylinder every time that a lever or other hand-operated element is actuated.

In any case, the cylinder holder has a gas outlet and, preferably, a gas pre-filter is fitted into said gas outlet to prevent any unwanted particles, that may block the subsequent gas passageways, from entering them. This filter will also constitute a security feature, because it will reduce the risk of the liquid carbon dioxide entering the filter.

The inlet bottle holder can be fixed or pivoted to the supporting structure, when present, and has means, such as a thread or bayonet, to secure the bottle in position. The bottle holder will comprise a gas inlet, a water outlet, and preferably a gas exhaust valve and a safety valve. Means are desirably provided, as hereinafter better explained, to count the number of unfiltered water bottles of standard volume, for instance, one liter, which are inserted into the apparatus, to determine the overall amount of water that has been purified by it.

The water outlet of the inlet bottle holder communicates, by means of a connecting tube or conduit, with the filter base, and the water flows out of the inlet or unfiltered water bottle into said tube or conduit through a dip tube that fits into the said bottle. It is preferred that the dip tube be fitted at its inlet end with a filter to prevent any large particles, that may be present in the unfiltered water, from entering the filter system.

The filter base is a support for an interchangeable filter unit and has an inlet and an outlet and means for causing the water to flow through the filter unit. The invention is not limited to any specific type of filter unit, but units comprising filter elements which include depth filter and microporous membrane means, a preferred embodiment whereof will be described hereinafter, are preferred. Further, it is preferred that an ultraviolet (UV) tube of wavelength and intensity sufficient to kill microorganisms and viruses be inserted between the inlet and the outlet of the filter base.

The water passes through a flow regulator to assure constancy of flow rate regardless of the pressure that may be exerted by the gas in the gas cylinder and of possible changes in the hydrodynamic resistance of the various components of the apparatus. The flow regulator may be part of the filter, and if not, the filtered water issuing from the filter base passes through it. The flow regulator may be of any known kind.

The invention further comprises an apparatus for purifying water, comprising, preferably in combination with a supporting housing and with power means, and unpurified water feed inlet and a purified water dispense outlet, an interchangeable filter having depth filter layers and microporous membrane means interposed between said inlet and said outlet, means for driving the water through the filter at a constant flow rate, means for counting the time passed from the installation of the filter, means for monitoring, with a desired accuracy, the volume of water which has flowed through the filter, and controlling devices for alerting the user when the data acquired by said counting and/or said monitoring means have reached a corresponding threshold values or any one of a plurality of successively increasing, predetermined threshold values, and preferably, means for automatically preventing the flow of water through the filter when the data acquired by said counting and/or said monitoring means have reached the corresponding threshold value or the highest of said plurality of the corresponding threshold values. The means for driving the water through the filter at a constant flow rate may comprise means for applying pressure to the unpurified water and means for controlling the water flow rate regardless of changes of said pressure.

The invention further comprises a method for purifying water, comprising:
I) providing a first container for unpurified water, a second container for purified water, both containers having the same volume, and filter means;
II) applying pressure to the unpurified water;
III) driving by said pressure a desired volume of water from said first to said second container while flowing through filter means, preferably through depth filter means and microporous membrane means;
IV) maintaining the water flow rate at a constant predetermined value;
V) dispensing said desired volume of purified water;
VI) repeating the said operations as many times as desired;
VII) counting the time passed from the installation of the filter means;
VIII) monitoring the volume of water which has flowed through the filter means; and
IX) changing the filter means when either said time or said water volume has reached a predetermined threshold value.

Preferably, the method comprising automatically preventing the flow of water through the filter means when either said time or said water volume has reached a predetermined threshold value.

Further preferably, the method comprises establishing an operating program which includes at least a pair of threshold values one of the time and the other of the water volume, and signaling the condition of the filter, constantly or at predetermined time intervals, to permit the user to know where said condition is situated in said operating program. In an embodiment of the invention, said operating program may include different, successively increasing pairs of threshold values of time and water volume, possibly corresponding to different performance requirements. For instance, the lowest pair may correspond to the requirement that the purified water be absolutely sterile and the higher pairs may correspond to the requirement that the purified water, while not being absolutely sterile, be potable or safely usable for other purposes.

BRIEF DESCRIPTION OF THE DRAWINGS

In the drawings:

FIGS. 6 to 8 show in schematic cross-sections, on the planes indicated by corresponding roman letters in FIG. 9, an apparatus according to an embodiment of the invention;

FIG. 9 illustrates the disposition of the components of the same apparatus in horizontal cross-section;

DETAILED DESCRIPTION OF PREFERRED EMBODIMENTS

Figure 1:
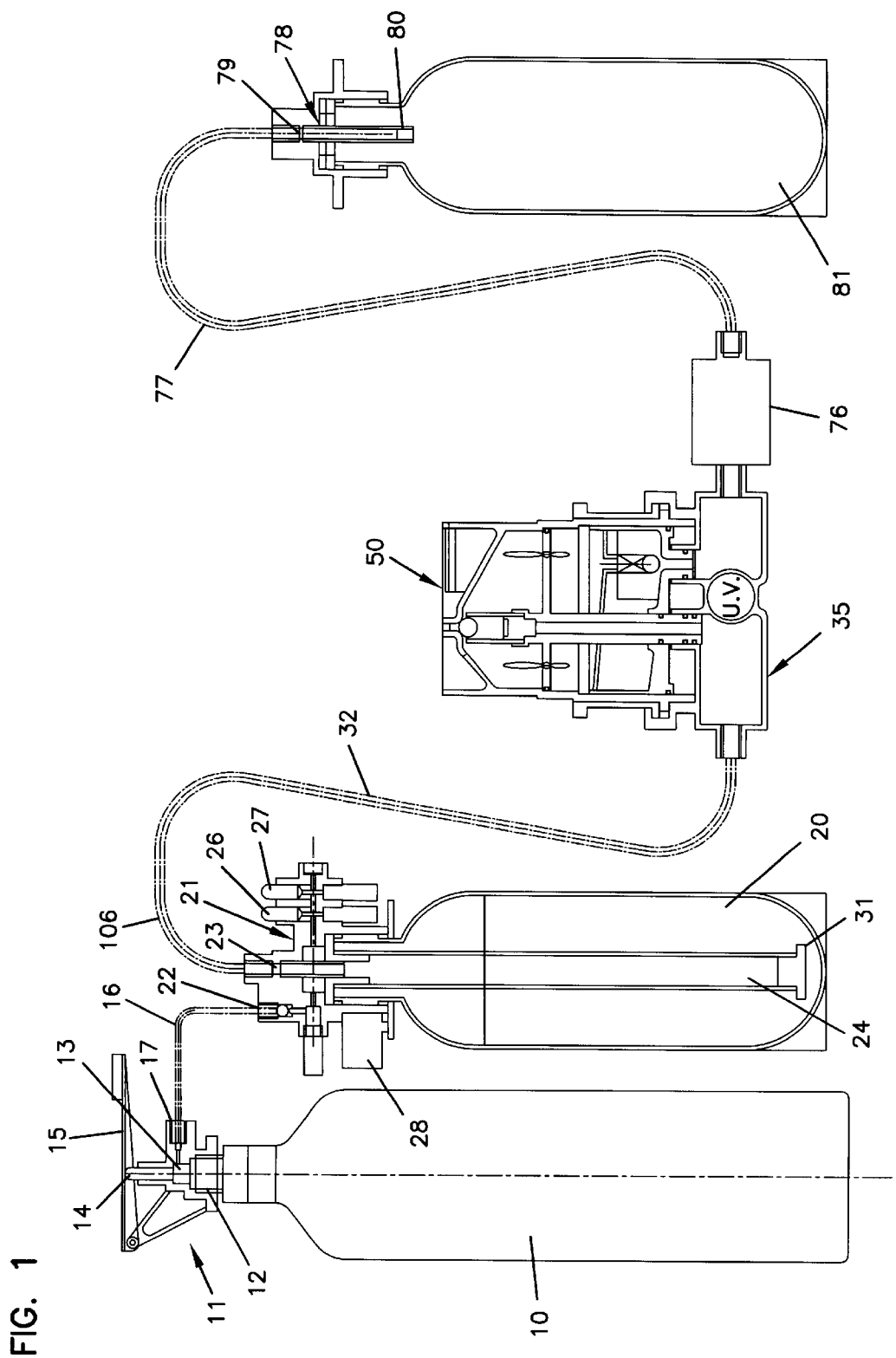
FIG. 1 is an exploded, schematic cross-sectional view of an apparatus according to an embodiment of the invention, not showing a supporting housing.

FIG. 1 is an exploded schematic representation of an embodiment of the invention. The components of the machine are not shown in their actual positioned relationship, and the supporting housing is not shown. The power supply means, which are conventional, are also not shown.

Figure 4:
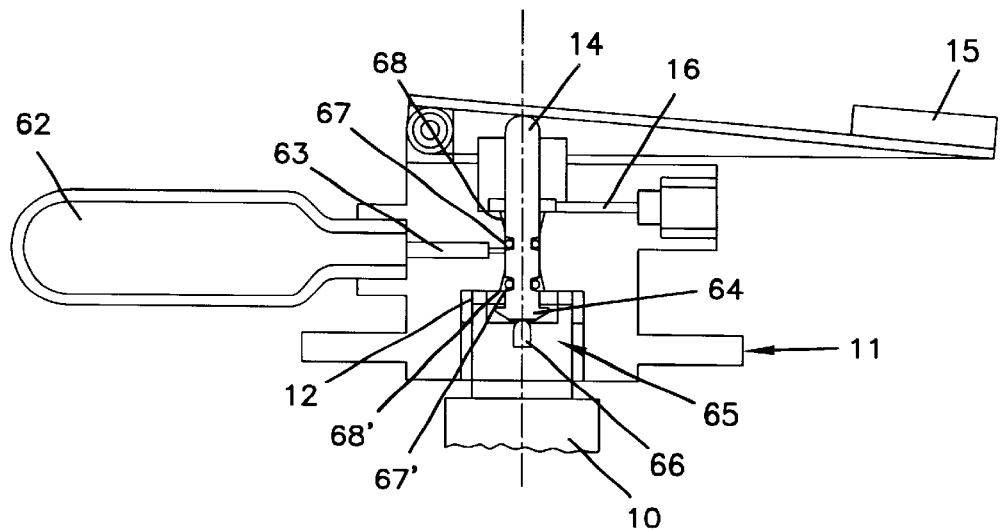
FIGS. 4 and 5 illustrate, in axial cross-section and in two different operating phases, an embodiment of a dosing unit
Figure 5:
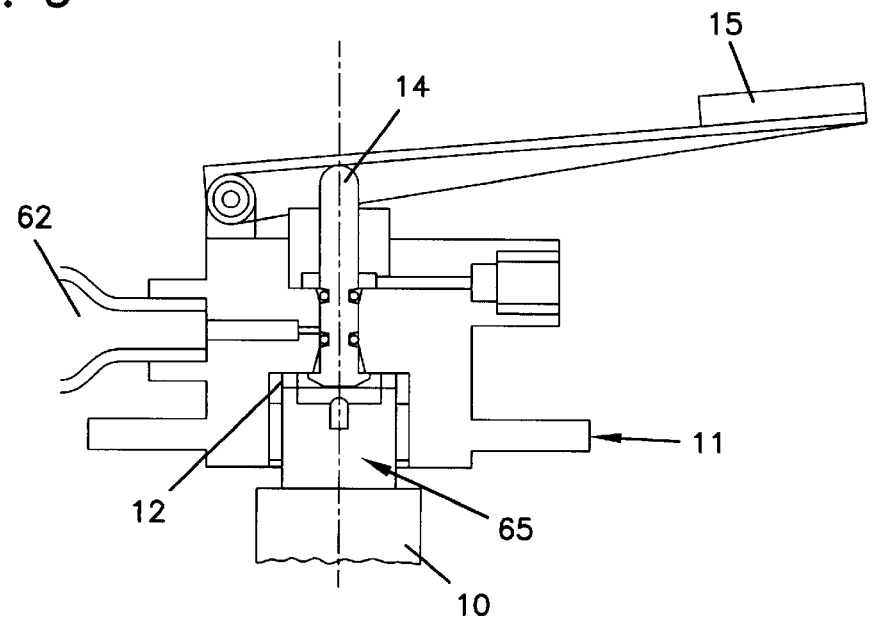

In this embodiment, a gas cylinder 10 is mounted on a cylinder holder generally indicated at 11. The cylinder holder may be of any kind adapted for liquid aerating machines and may be, in particular, such as described in the aforesaid EP 0 472 995 B1. Another cylinder holder, which is part of an embodiment of the invention, is schematically illustrated in FIGS. 4 and 5. In general, the gas cylinder holder will comprise means, such as screw means 12, for attaching the gas cylinder 10 to it, and comprise a gas cylinder valve, unless this is part of the gas cylinder itself. The gas cylinder valve, which is not shown in detail in FIG. 1, is generally indicated at 13, and this, as does for instance the cylinder holder of the aforesaid EP, comprises a valve outlet, a valve poppet which is urged by elastic means to close said valve outlet, and a plunger, indicated in FIG. 1 at 14, which can be depressed by means of a lever 15 to force the poppet, against the reaction of the elastic means, to open the outlet and allow gas to escape from the gas cylinder. In the mechanism schematically represented in FIG. 1, gas will continue to escape from the gas cylinder as long as lever 15 is depressed by the operator. Alternatively, a dosing unit can be provided to cause a predetermined amount of gas to escape from the gas cylinder each time said dosage unit is actuated.

Figure 4A:
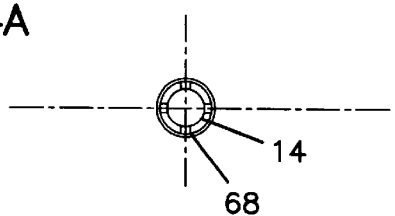
FIG. 4a is a horizontal cross-section of a detail of FIG. 4.

An embodiment of a dosage unit is shown in FIGS. 4 and 5 in schematic cross-section on a plane passing through the axis of the gas cylinder outlet valve. Said dosage unit comprises a gas reservoir 62 which is connected by passage 63 to the cylindrical space in which plunger 14 is housed. The said space communicates with conduit 16', which is the inlet of conduit 16. In this embodiment of the device, the plunger 14 is provided, at its lowermost end, with a head 64 which is so shaped as to seal the outlet of the chamber housing the gas outlet valve, generally indicated at 65. The gas cylinder valve poppet is not shown, except for its tip 66, which is in contact with head 64 of plunger 14. Plunger 14 is furthermore provided with two peripheral seal rings 67 and 67'. The cylinder in which plunger 14 is housed is provided with cut-offs 68 and 68' on two planes, as shown in the detail of FIG. 4a, which is a cross-section of plunger 14 through the plane of cut-offs 68, but is identical to a cross-section 14 through the plane of cut-offs 68'.

In the position of FIG. 4, lever 15 has been depressed to release gas. Plunger 14 has pressed down on gas cylinder valve poppet, thus opening the cylinder valve, seal ring 67' does not prevent the passage of gas because of the presence of cut-offs 68', and gas escapes from the cylinder and fills gas reservoir 62 through passage 63. When lever 15 is released, the device assumes the position of FIG. 5. Seal ring 67' has risen above cut-offs 68' and therefore prevents any gas passage from the gas cylinder to the reservoir 62. However, concurrently, seal ring 68 has risen to the level of cut-offs 67, so that gas can escape from reservoir 62 through conduit 63 and through said cutt-offs to conduit 16' and thence to conduit 16. In this way, the amount of gas which has filled reservoir 62 is fed to the water bottle each time that the plunger 14 or lever 15 is depressed and released.

The gas escapes through conduit 16 and at the inlet of said conduit passes through a pre-filter 17 which is a small block of porous material fixed to the outlet of the cylinder holder and which retains unwanted particles that may block the subsequent gas passageways. This filter will also perform as a safety feature, as it will reduce the risk of liquid carbon dioxide entering the main filter unit, hereinafter described.

Figure 15:
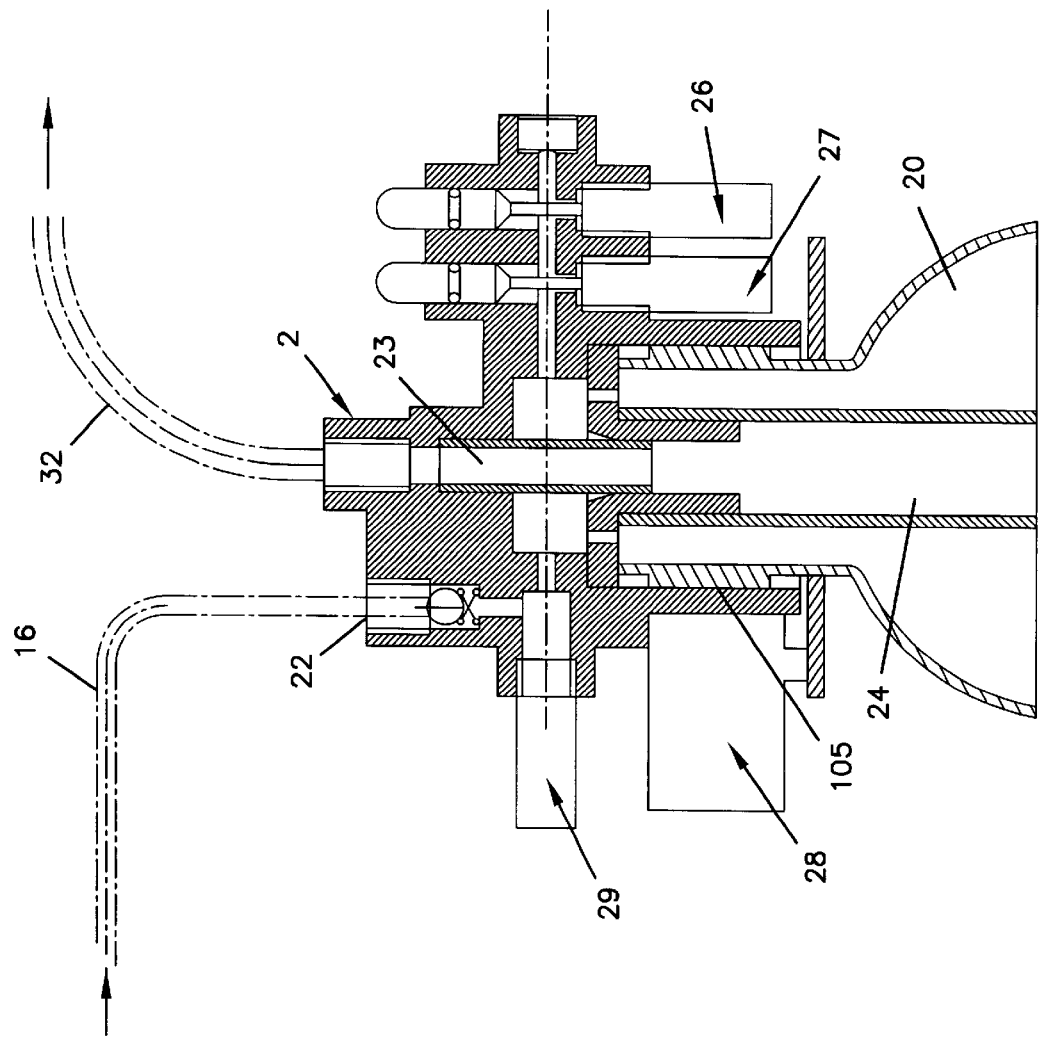
FIG. 15 is a cross-section of an embodiment of the inlet bottle holder.

An embodiment of inlet bottle holder is illustrated at an enlarged scale in FIG. 15. An unfiltered water bottle 20 is held in said holder, generally indicated at 21. The inlet bottle holder has an inlet 22 for gas conduit 16 and may be fixed or pivoted to the supporting structure (not shown in FIG. 1) and have a thread or bayonet 105 to secure the bottle 20 in position. If a thread is used, it should be different from that used for attaching the filtered water bottle to the dispense bottle holder, hereinafter described. The inlet water holder 21 also has a water outlet 23 leading to unfiltered water conduit 32. Water outlet 23 is connected, at its lower end, to the upper, outlet end of a dip tube 24. Dip tube 24 is preferably provided at its inlet end with a filter 31 to prevent larger particles, that may be present in the unfiltered water, from entering the filter unit. Preferably, dip tube 24 is separate from the bottle 20 and fits into it, thereby making its insertion easier. In a preferred form of the invention, the holder 21 also houses an exhaust valve 26 and a safety valve 27, which both open when a bottle of unfiltered water is loaded onto the holder. These valves, only schematically illustrated in FIG. 15, may be of any type, e.g. such as described in cited EP 0 472 995 B1. If the holder 21 is pivoted, the valves will open when it is swung outwards to permit loading an unfiltered water bottle 20.

The holder 21 can also house a counter 28, of any convenient type, for counting the number of bottle insertions, and therefore, since each bottle has a given volume, the amount of water which is filtered. The counter may be resettable manually or automatically when the filter unit is replaced. The holder 21 may also house a pressure sensor 29, which is a pressure switch set to pass an electrical signal when the pressure rises above a predetermined pressure, for instance, 0.5 bar. As the system pressure is very unlikely to drop below said pressure, e.g. 0.5 bar, during the operation of the machine, it can be assumed that each time the said signal has been given, the machine has been used once and an amount of water corresponding to the volume of the said bottle, say 1 liter, has been filtered. Each time that an empty bottle is removed, any remaining pressure is discharged, and each time a new, full one is mounted on the bottle holder, the pressure must be re-established, so that counting the times that said predetermined pressure is exceeded means counting the number of times that a bottle has been emptied and therefore the number of liters of water passing through the machine. Non-return valve 30 may also be incorporated in the gas inlet of holder 21, to ensure that no water siphons back from bottle 20 to cylinder holder 11.

When gas under pressure is introduced into bottle 20, unfiltered water flows out through water outlet 23 and from it through a conduit 32, to reach a filter base generally indicated at 35. Filter base 35 has an inlet 36, an inlet chamber 37, an outlet chamber 38 and an outlet 40. Inlet chamber 37 and outlet chamber 38 are separated by a UV source or lamp 42. Filter base 35 is also provided with a peripheral retaining wall 43, having an external ring 44 which comprises an upper flange 45. The filter base 35 is also provided with electronic connections to the filter unit to be described, which are not shown, as well as with power supply means, also not shown.

Figure 3:
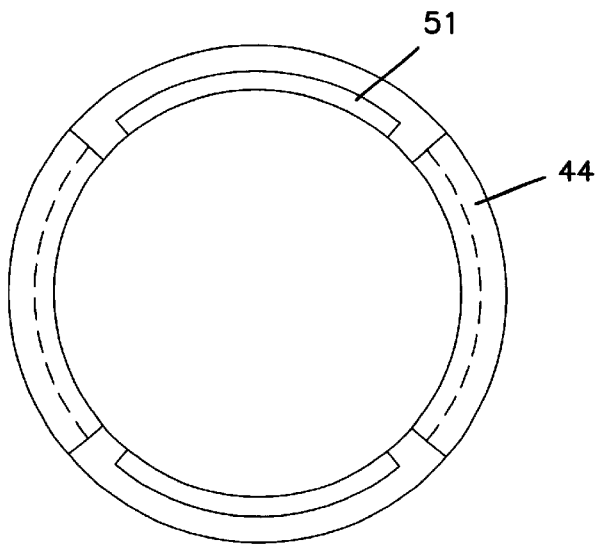
FIGS. 2 and 3 illustrate at an enlarged scale, in axial cross-section and in horizontal cross-section on plane III—III of FIG. 2, looking in the direction of the arrows, an embodiment of filter unit employed in the apparatus of FIG. 1.
Figure 2:
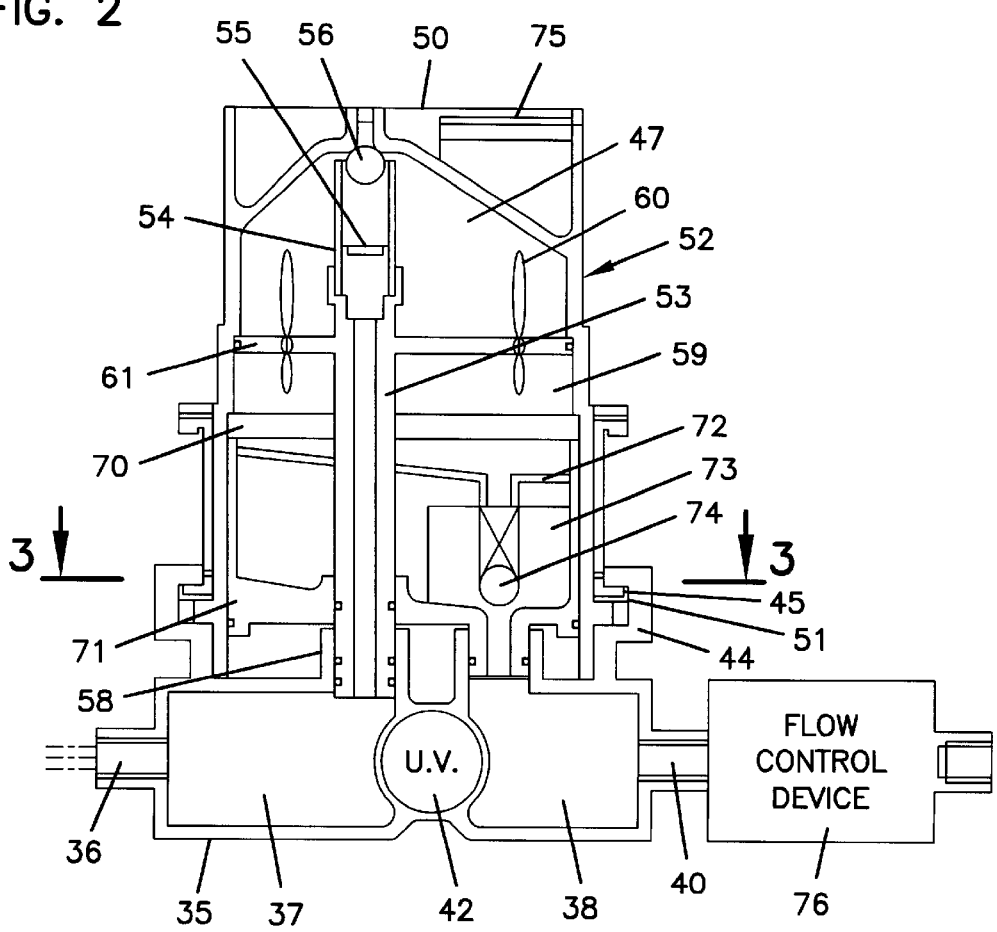
Figure 16:
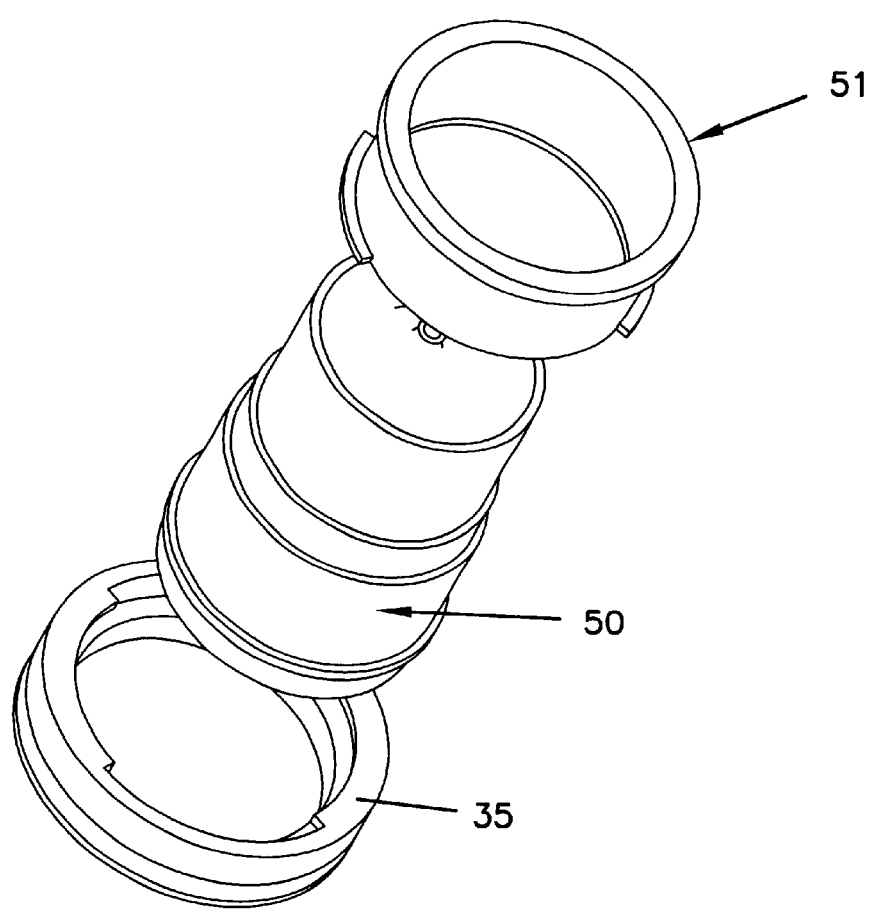
FIG. 16 is a schematic, exploded, perspective view of an embodiment of a filter unit.

The filter unit, which fits into the filter base, and is schematically illustrated in exploded perspective view in FIG. 16 and in axial cross-section in FIG. 2, is generally indicated at 50. The filter unit is held in connection with the base 35 by a bayonet sleeve 51, which clamps the filter to the base by using the flange around the opening of the filter, as seen in the cross-section of FIG. 3. Both the flange 45 and the bayonet sleeve 51 extend along two opposed arcs of 90° each and are interrupted elsewhere. When the said arcs of flange 45 and sleeve 51 are in the same angular position, they clamp the filter to the base. When said arcs are relatively displaced by 90°, the filter is disengaged and can be lifted from the base. The filter unit 50 is provided with a housing generally indicated at 52, in which is fixed or molded a central tube 53, the bottom inlet of which fits into a sleeve 58 of the filter base. Water flows from inlet chamber 37 of the filter base around the UV lamp 42, into tube 53, through a pre-filter 54, which contains a silver impregnated slug 55, into an upper chamber 57 of the filter unit. A float blow valve 56 is provided for releasing trapped air.

Figure 12:
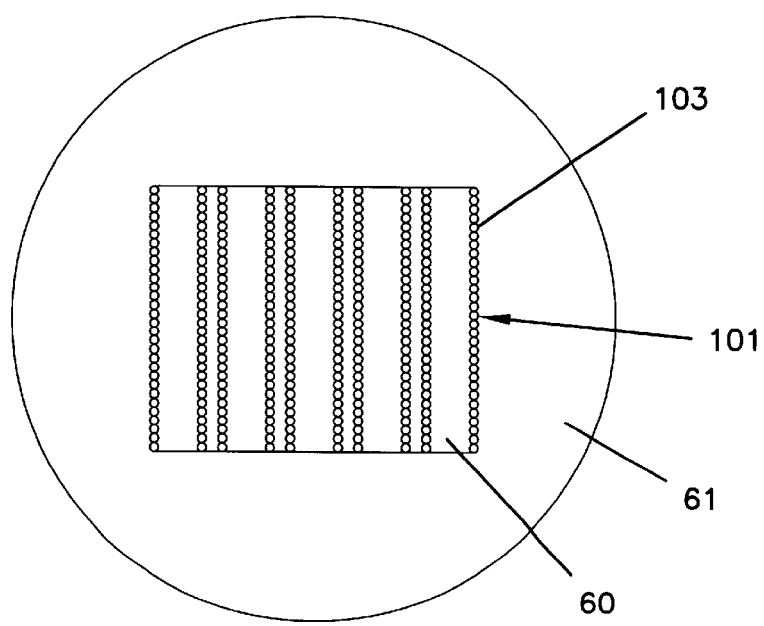
FIGS. 12 and 13 schematically illustrates, in plan view and vertical cross-section, an embodiment of a main filter component.
Figure 13:
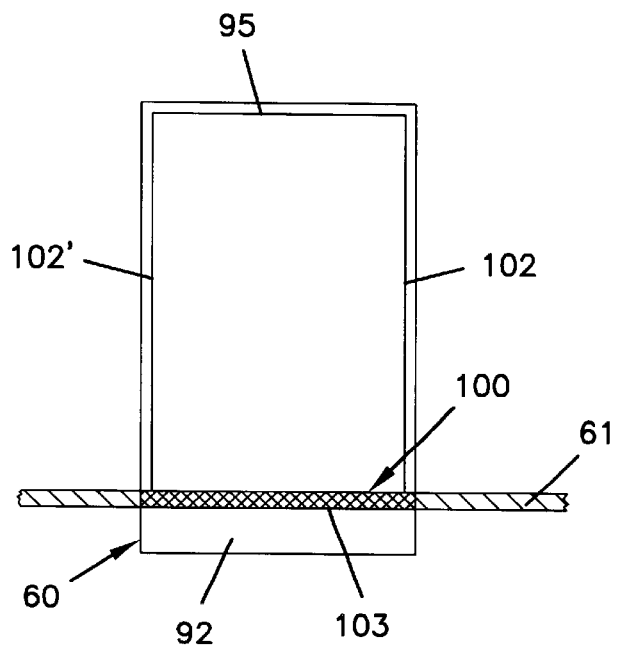

The main filter component, in the embodiment being described, is constituted by a number of filter elements 60 mounted on a plate 61, as shown in FIGS. 12 and 13. Each filter element comprises a pre-filter or depth filter and a microporous membrane, and is preferably of the type described in a copending Israeli Patent Application, Attorney's docket No. 4364, the contents of which are incorporated herein entirely by reference.

Figure 14:
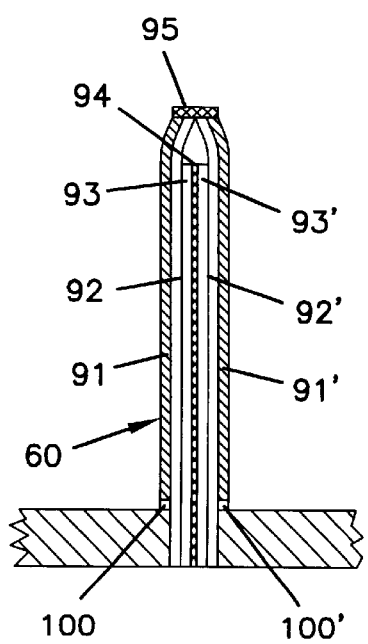
FIG. 14 is a cross-section of an element of said component at an enlarged scale.

An embodiment of such a filter element 60 is shown in FIG. 14. It comprises two outer layers of depth filter or prefilter 91 and 91', which are preferably made of glass fiber. Internally of layers 91 and 91', the filter element comprises layers 92 and 92' pf microporous membrane, preferably having a practically complete (more than 99%) retentivity for microorganisms, which are supported respectively on support fabrics 93 and 93'. All the aforesaid layers are arranged symmetrically about a substantially open plastic netting 94, which constitutes a drainage layer to conduct away the fluid passing through the aforesaid layers 91–91', 92–92', and 93–93'. Depth filter layers 91–91' and microporous membrane layers 92–92' are congruent at the top and sealed together at 95 by means of adhesive or by welding. They are also sealed together at the edges 102. The drainage layer 94 and the fabric support layers 93–93' do not extend up to the top of the element, viz. to the seal 95, although, in an embodiment of the invention in which welding is used, the layers 93 and 93' may reach to the edge seal and be sealed thermoplastically together. In FIGS. 12 and 13, described hereinafter, prefilter layers 91–91' do not reach to the bottom of the element, but the microporous membrane layers, support fabric layers and drainage layers protrude beyond them towards the bottom. The depth filter layers 91–91' are sealed at the bottom at 100–100' and laterally at 102 to the microporous membrane layers 92–92'. Support layers 93–93' and drainage layer 94 are narrower than the other layers and do not take part in seals 102.

Filtering means, in this embodiment a number of filter elements 60, are mounted on plate 61, as particularly illustrated in FIGS. 12 and 13. Plate 61, preferably but not necessarily circular, has a number of slits 101, one for each element 60. A filter elements 60 is passed through each of said slits, in such a way that their edges 100 are at the same level as the upper edge of plate 61. The filter elements are then potted to plate 61 by filling the empty space between them and the inner edges the slits of plate 61 with a suitable adhesive 103, so that no path of fluid flow exists between the elements 60 and the plate 61.

The water passes from chamber 57 through the various layers of each element 60, entering from outer depth layers 91–91' and exiting from drainage layer 94, and reaches chamber 59, defined by plate 61 and by a carbon filter 70. Then, the water passes into a second chamber 71' defined by said carbon filter 70 and by retaining plate 72, directing the filtered water into a liter-counter 73 and around a shut-off device 74 of the sealing plate 71. This assures that when the predetermined, recommended volume water has flowed through the filter unit, the shut-off becomes active and the filter is rendered non-usable. The shut-off feature can also be actuated by an electronic central control unit to render the filter non-usable after a period of time or a predetermined volume of water has passed through the filter, or it can be actuated by mechanical means. This time and liter-counter may be stored electronically in a small printed circuit board 75 fixed to the filter and which is placed in electrical contact when the filter is fitted into the base.

From the liter-counter 73, the water flows into the outlet chamber 38 of the filter base, around the UV lamp and in the passages 40, and therefrom into a flow control device 76 of any suitable type. From the flow control device 76, the filtered water flows at constant and controlled flow rate through a conduit 77 into a dispense bottle holder 78, which has an inlet 79 at the end of which is preferably located a silver impregnated porous block 80. Dispense bottle holder 78 is open to the atmosphere to prevent the build-up of any back pressure. The filtered, purified water gathers into a dispense bottle 81, e.g., having a volume e.g. of one liter and at any rate the same volume as the unfiltered water bottle. To assist the insertion of the dispense bottle holder, this may be pivoted on the housing and support as such in the same way as the unfiltered water holder is pivoted.

The filter unit preferably contains a non-volatile memory to store the number of liters filtered, an identity number and a timer powered by an on-board battery, to measure elapsed time from the start up of the filter. The pressure sensor sends a signal to the CPU each time the pressure of the system raises above a pre-set figure. The display is mounted on the front of the machine and displays the condition of the filter by a series of LED's. A reset button is provided to be used by the operator after replacing a cylinder. The filter reset is automatic when a new filter is fitted and the electronic connections are made.

Figure 10:
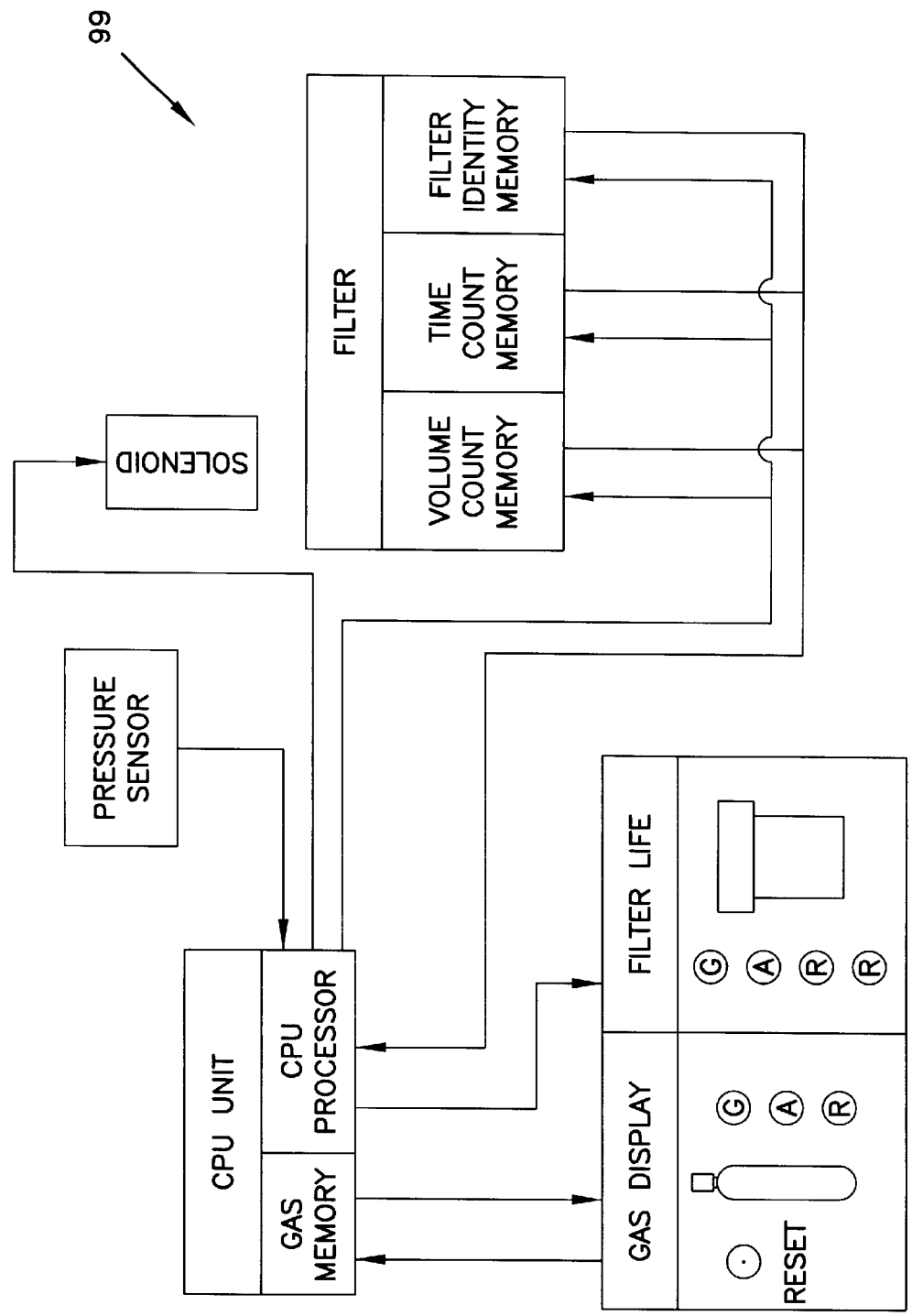
FIG. 10 is a block diagram illustrating the electronic system of the apparatus.

The structure and operation of a particular embodiment of the electronic control unit will now be described FIG. 10 is a block diagram of such a unit, generally indicated at 99. The control unit counts the time and the water volume, which is conveniently expressed as a number of bottles of unfiltered water which have passed through the machine. The time memory (indicated in the diagram as "gas display") controls a first display which has three display lights, for instance, red, amber and green and correspondingly indicated in the drawing by R, A and G, as well as a reset button. The volume memory (indicated in the diagram as "filter life") controls another display which has three display lights having the same colors and additionally a fourth light which may be, for example, red, as well. A pressure sensor is also connected to the CPU, as is a solenoid which operates as hereinafter set forth.

Figure 11:
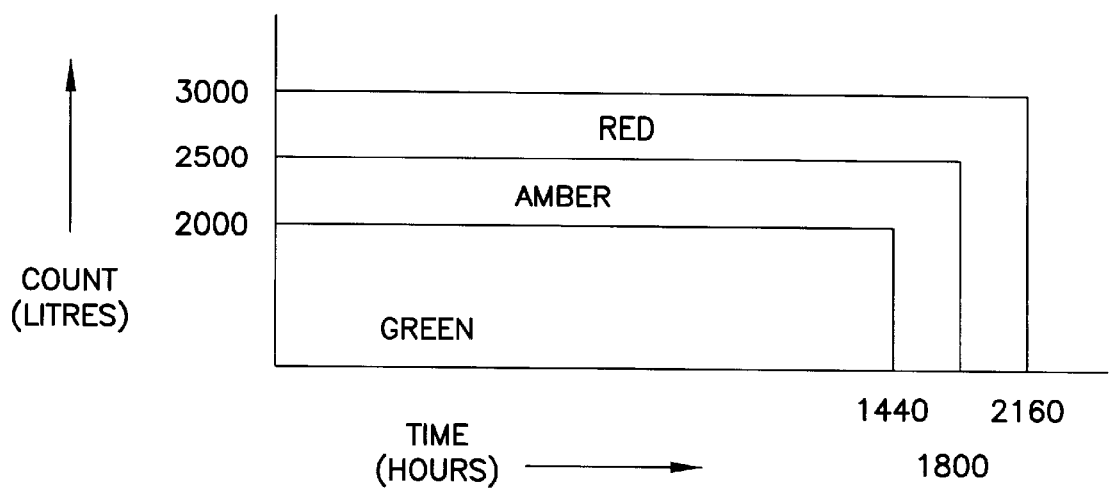
FIG. 11 graphically illustrates an operating diagram of the system of FIG. 10.

The memory of the CPU contains an operating program which is graphically and schematically illustrated in FIG. 11, wherein the abscissa is the time, e.g., in hours, and the ordinate the volume count e.g., in liters. In the diagram, are defined three maxima for the volume count and three maxima for the time, which maxima limit three areas, respectively green, amber and red. These may correspond to three different operating requirements. The lowest maxima may provide sterile water, the intermediate ones potable water, and the highest ones water that is safe for other purposes. The CPU is programmed to compare the identity of the filter to the machine number. If the identity of the filter matches the machine number, the filter is new, is accepted and the machine operates as hereinafter set forth. If it does not match, a red signal is displayed and the machine is disabled, as hereinafter set forth.

When the operation of the apparatus is started, the pressure sensor is activated and the timer is activated. The pressure sensor sends the signals through the CPU to the volume count of the control unit. The timer in the control unit counts the time. At predetermined time intervals, for example, each hour, the CPU compares the volume count and the time to the memorized program of FIG. 11. If neither the lowest maximum volume nor the lowest maximum time have been exceeded, the green light is activated: the apparatus continues to operate. If either the of said volume count or time is exceeded, the corresponding amber light is activated. If either the intermediate maximum volume count or the intermediate maximum time are exceeded, the corresponding red light is activated. The action to be taken in each case, e.g., the replacement of the filter, depends on the user's requirements. If the highest maximum volume count or the highest maximum time are exceeded, the second red light is also activated, indicating a situation of danger and the machine is disabled by energizing a solenoid, which moves a pin into such a position so to prevent the lever, that causes the feeding of gas to the unfiltered water bottle (15 in FIGS. 4 and 5) from being depressed, whereby the machine is rendered unusable. The solenoid is preferably of the latching type, and requires only short pulse signals to change its state. The CPU, however, could be programmed, according to the user's requirements, to actuate the solenoid before then, e.g. when one or both of the intermediate or even the lowest maxima has been reached, When the filter has been changed, all the memories are reset to 1.

While an embodiment of the invention has been described by way of illustration, it will be apparent that the invention may be carried out by persons skilled in the art with many modifications, variations and adaptations, without departing from its spirit or exceeding the scope of the claims

What is claimed is:

1. Apparatus for purifying water, comprising a supporting housing, power means, an unpurified water inlet and a purified water dispense outlet, a filter means interposed between said inlet and said outlet, means for driving water through the filter means at a constant flow rate comprising a cylinder holder, on which an interchangeable gas pressure cylinder can be mounted and a gas release mechanism housed in the cylinder holder, timing means for counting the elapsed time from a predetermined moment, and monitoring means for monitoring the volume of water which has flowed through the filter unit, characterized in that the filter means comprises an interchangeable filter unit selectively disengageable from a base, wherein said filter unit comprises:
at least one filtering element; and
a filter memory for storing at least said counted elapsed time and said monitored volume, said filter memory operatively connected to said timing means and said monitoring means, respectively, when said filter unit is engaged in said base.

2. Apparatus according to claim 1, further comprising flow and usage control devices operatively connected to said computer processing means, having alerting means for alerting a user when at least one of the said monitored volume and said counted elapsed time has reached at least one of:
a corresponding threshold value; or
any one of a plurality of successively increasing, predetermined threshold values.

3. Apparatus according to claim 2, wherein the flow and usage control devices comprise stopping means operatively connected to said computer processing means, for automatically preventing the flow of water through the filter unit when at least one of the said monitored volume and said counted elapsed time the data acquired by said counting and/or said monitoring means has reached at least one of:
a corresponding threshold value;

or the highest of a plurality of successively increasing, predetermined threshold values.

4. Apparatus according to claim 3, wherein the means for automatically preventing the flow of water through the filter comprise a filter shut-off mechanism.

5. Apparatus according to claim 2, wherein the flow and usage control devices are electronic.

6. Apparatus according to claim 5, wherein the flow and usage control devices comprise a CPU, timing means for counting the elapsed time from the a predetermined moment, and monitoring means for monitoring the volume of water which has flowed through the filter, and means for producing and displaying visible signals indicating the relationship between the counted elapsed time and the monitored volume, and a predetermined operating program.

7. Apparatus according to claim 6, wherein the flow and usage control devices further comprise means for preventing the flow of water through the filter when one of the counted elapsed time or said monitored volume, has reached a predetermined threshold value.

8. Apparatus according to claim 6, wherein the elapsed time is counted from the installation of the filter.

9. Apparatus according to claim 6, wherein the means for measuring the volume of water that has passed through the filter are distinct from and independent of the flow regulator.

10. Apparatus according to claim 1, wherein said at least one filtering element comprises multiple layers of a prefilter material, a submicron membrane filter having at least about 99% retentivity for microorganisms, in serial arrangement in a direction of flow through the filter unit.

11. Apparatus as claimed in claim 10, wherein said filter means further comprises an activated carbon filter, in serial arrangement with said filter elements in a direction of flow through the filter unit.

12. Apparatus according to claim 1, wherein the unpurified water feed inlet is defined in an inlet bottle holder, for receiving an unfiltered inlet water bottle;
the means for driving water at a constant flow rate further comprises a flow regulator, and conduit means for successively connecting together the cylinder holder, the inlet bottle holder, the filter, and the flow regulator; and
the apparatus further comprising a dispense water holder and a dispense water bottle for dispensing the filtered water, connected to said filter by said conduit means.

13. Apparatus according to claim 12, wherein the flow regulator is part of the filter means.

14. Apparatus according to claim 12, wherein the flow regulator is connected to an outlet of the filter means.

15. Apparatus according to claim 12, wherein the interchangeable gas cylinder contains carbon dioxide under pressure.

16. Apparatus according to claim 12, wherein the inlet bottle is of sufficient strength to contain a pressure of about 10 atmospheres.

17. Apparatus according to claim 12, wherein the cylinder holder is a cylinder holder adapted to receive a gas pressure cylinder in a liquid aerating machine.

18. Apparatus according to claim 12, wherein the gas releasing mechanism is directly controlled by the operator.

19. Apparatus according to claim 12, wherein the gas release mechanism is a dosing unit adapted to release a predetermined dose of gas from the gas cylinder, every time it is actuated.

20. Apparatus according to claim 12, wherein the cylinder holder has a gas outlet and a gas pre-filter is fitted into said gas outlet.

21. Apparatus according to claim 12, wherein the inlet bottle holder is pivoted to the supporting structure.

22. Apparatus according to claim 12, wherein the inlet bottle holder contains a gas inlet, a water outlet, a gas exhaust valve and a safety valve.

23. Apparatus according to claim 12, comprising means for counting the number of unfiltered water bottles inserted into the apparatus.

24. Apparatus according to claim 12, wherein said base comprises a base inlet and a base outlet in respective fluid communication with said unpurified water inlet and said purified water dispense outlet, and wherein said filter unit comprises a filter inlet and a filter outlet in fluid communication with said base inlet and said base outlet, respectively, when said filter unit is engaged in said base, said base further comprises means for causing the water to flow through the filter unit.

25. Apparatus according to claim 24, wherein said base further comprises a UV source inserted between the said base inlet and said base outlet, the UV source being of wavelength and intensity sufficient to kill microorganisms and viruses passing through the base.

26. Apparatus as claimed in claim 25, wherein said UV source is arranged within said base such as to act on water entering said filter unit as well as water exiting said filter unit.

27. Apparatus according to claim 12, wherein a pre-filter is provided fixed to the outlet of the cylinder holder.

28. Apparatus according to claim 12, wherein a dip tube is provided in the inlet water bottle.

29. Apparatus according to claim 28, wherein the dip tube is provided at its inlet end with a filter.

30. Apparatus according to claim 12, wherein the inlet bottle holder is provided with an exhaust valve and a safety valve.

31. Apparatus according to claim 12, wherein the inlet bottle holder is provided with a counter for counting the number of bottle insertions.

32. Apparatus according to claim 12, wherein said at least one filtering element comprises multiple layers of a prefilter material, a submicron membrane filter having at least about 99% retentivity for microorganisms, in serial arrangement in a direction of flow through the filter unit.

33. Apparatus according to claim 32, wherein the filter elements are mounted on a plate interposed between an upper and a lower chamber of the filter unit.

34. Apparatus as claimed in claim 32, wherein said filter means further comprises an activated carbon filter, in serial arrangement with said filter elements in a direction of flow through the filter unit.

35. Apparatus according to claim 1, wherein the means for driving the water through the filter at a constant flow rate comprise means for applying pressure to the unpurified water and means for controlling the water flow rate regardless of changes of said pressure.

36. Apparatus according to claim 1, wherein said timing means and said monitoring means include a computer processing means capable of counting said elapsed time and said volume.

37. Apparatus as claimed in claim 1, further comprising flow rate control means for providing a constant predetermined flow rate of purified water to said outlet.

38. Apparatus as claimed in claim 1, wherein said base comprises a base inlet and a base outlet in respective fluid communication with said unpurified water inlet and said purified water dispense outlet, and wherein said filter unit comprises a filter inlet and a filter outlet in fluid communication with said base inlet and said base outlet, respectively, when said filter unit is engaged in said base.

39. Apparatus as claimed in claim 38, wherein said base further comprises a UV source inserted between the said base inlet and said base outlet, the UV source being of wavelength and intensity sufficient to kill microorganisms and viruses passing through the base.

40. Apparatus as claimed in claim 39, wherein said UV source is arranged within said base such as to act on water entering said filter unit as well as water exiting said filter unit.

41. Apparatus as claimed in claim 1, wherein said filter memory comprises said timing means and a battery.

42. Apparatus as claimed in claim 1, wherein said filter memory further comprises an identity number of the filter unit.

43. Apparatus as claimed in claim 42, wherein said computer processing means is capable of identifying the identity number of the filter unit, and further comprises stopping means operatively connected to said computer processing means, for automatically preventing the flow of water through the filter unit when the identity number does not match a predetermined number.

44. Method for purifying water, which comprises providing a first container for unpurified water and a second container for purified water and applying pressure to the unpurified water, characterized in that it further comprises:

I) driving by said pressure a predetermined, unitary volume of water from said first to said second container while flowing through filter means;

II) maintaining the water flow rate at a constant predetermined value by means comprising a cylinder holder, on which an interchangeable gas pressure cylinder can be mounted and a gas release mechanism housed in the cylinder holder;

III) dispensing said unitary volume of purified water;

IV) repeating said operations as many times as desired;

V) counting the time passed from a predetermined moment;

VI) monitoring the volume of water which has flowed through the filter means; and VII) changing the filter means when either said time or said water volume has reached a predetermined threshold value.

45. Method according to claim 44, which comprises driving the water from said first to said second container while flowing through depth filter means and microporous membrane means.

46. Method according to claim 44, wherein the predetermined moment is the moment of the installation of the filter means.

47. Method according to claim 44, further comprising automatically preventing the flow of water through the filter means when either the time from the predetermined moment or the water volume has reached a threshold value.

48. Method according to claim 44, further comprising establishing an operating program which includes at least a pair of threshold values, one of the time and the other of the water volume, and signaling the condition of the filter, constantly or at predetermined time intervals, to permit the user to know where said condition is situated in said operating program.

49. Method according to claim 48, wherein the operating program includes different, successively increasing pairs of threshold values of time and water volume.

* * * * *

UNITED STATES PATENT AND TRADEMARK OFFICE
CERTIFICATE OF CORRECTION

PATENT NO.    : 6,319,414 B1
DATED         : November 20, 2001
INVENTOR(S)   : Wiseburgh et al.

It is certified that error appears in the above-identified patent and that said Letters Patent is hereby corrected as shown below:

<u>Column 9,</u>
Line 20, please insert the following paragraphs:

-- Figs. 6 to 8 illustrate a complete apparatus according to an embodiment of the invention, showing the housing 110, the gas cylinder 10, the unfiltered water bottle 20, the filtered water bottle 81 and the filter unit 50. The control unit is symbolically indicated at 99 in Fig. 8. Fig. 9 shows in schematic horizontal cross-section how the components of the apparatus are disposed within housing 110, according to an embodiment of the invention, in order to exploit as much as possible the space available in a housing having a rectangular cross-section, but it will be apparent that this is only an example, since both the shape and size of the housing and the arrangement of the various units within the housing can be changed in many ways to obtain the most desirable results. In this embodiment, power is supplied by a battery, but it could be supplied from a line, possibly through an AC/DC converter.

This embodiment of the machine is provided with a central electronic control system and a power source such as a battery. The control system comprises CPU and other components, which are conveniently mounted on a small printed circuit board within the body of the machine. This apparatus identifies each new un-numbered filter by an identity number, receives signals from the pressure switch and sends signals to its own gas memory and to the volume memory located on the filter unit. At predetermined intervals or when the machine is operated, it will:
  when operated, add one count to the relevant memory areas, compare its own gas memory against a pre-set limit and display the results, interrogate the filter memory for volume, time and identity, compare these with the pre-set limits and display the result,

UNITED STATES PATENT AND TRADEMARK OFFICE
CERTIFICATE OF CORRECTION

PATENT NO.    : 6,319,414 B1
DATED         : November 20, 2001
INVENTOR(S)   : Wiseburgh et al.

It is certified that error appears in the above-identified patent and that said Letters Patent is hereby corrected as shown below:

if necessary, in particular if an incorrect identity of filter is received, if no filter is fitted, or if the filter is outside the pre-set parameters, disable the machine, as hereinafter described. --

Signed and Sealed this

Twenty-seventh Day of August, 2002

*Attest:*

JAMES E. ROGAN
*Attesting Officer*     *Director of the United States Patent and Trademark Office*